United States Patent

[11] 3,603,670

[72] Inventor Sangbong Kim
422 S. Mansfield Ave., Los Angeles, Calif. 90036
[21] Appl. No. 888,463
[22] Filed Dec. 29, 1969
[45] Patented Sept. 7, 1971

[54] DIRECTIONAL PANEL ADAPTED TO CONTROL THE PASSAGE OF INCIDENT RADIATION
9 Claims, 6 Drawing Figs.
[52] U.S. Cl. ...................................................... 350/260,
350/265, 350/276
[51] Int. Cl. ...................................................... G02b 17/00
[50] Field of Search .......................................... 350/258,
260, 264, 265, 276, 318

[56] References Cited
UNITED STATES PATENTS
3,393,034   7/1968   Imai ............................. 350/260

*Primary Examiner*—Donald O. Woodiel
*Attorney*—John Holtrichter, Jr.

ABSTRACT: A directionally transmissive optical panel or structure, which is adapted to control the passage therethrough of incident electromagnetic radiation in the visible and invisible spectral regions, is provided. The panel or structure is fabricated with a pair of transparent or translucent plates each having a flat surface and a corrugated surface generally including a series of peaks and valleys extending along the width or horizontal dimension of the respective plates, alternate sections of the corrugated surfaces being fashioned to have an opaque or reflective coating. The corrugated surfaces are maintained in interlocking intimate optical contact.

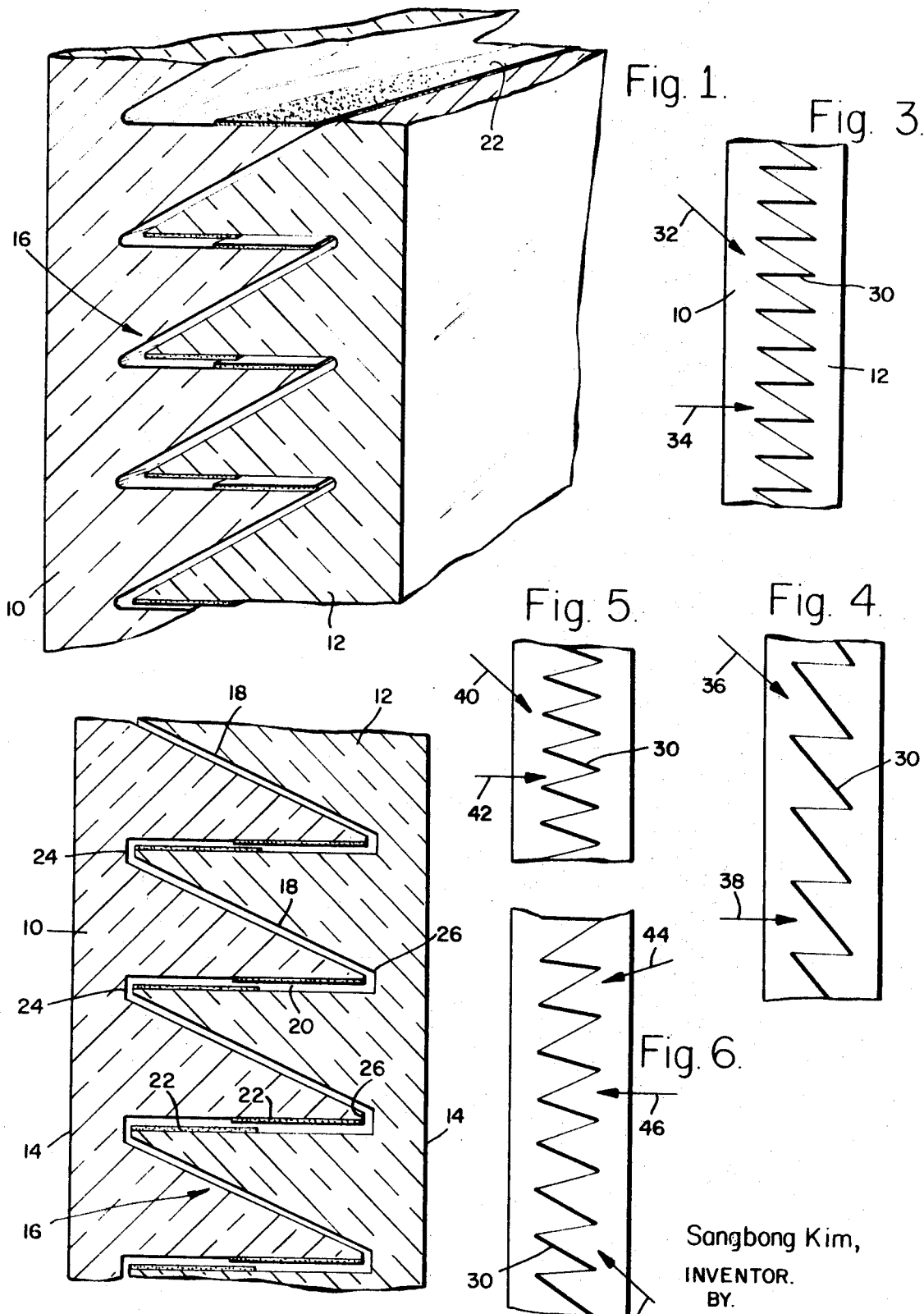

DIRECTIONAL PANEL ADAPTED TO CONTROL THE PASSAGE OF INCIDENT RADIATION

BACKGROUND OF THE INVENTION

This invention generally relates to optically transparent panels which may be used for controlling the amount of electromagnetic radiation, in the visible and infrared spectral regions, that is allowed to be projected into a particular area or enclosure, such as a room, while yet permitting sight along predetermined lines.

There are many situations in which the incidence of direct sunlight into a room is damaging and/or undesirable. For example, in offices and homes the incidence of direct sunlight can cause discomfort as a result of the heating of the room due to electromagnetic radiation in the infrared spectral region. Further, in the case of store show-windows the incidence of electromagnetic radiation in the ultraviolet spectral region can cause the fading of fabric coloring and the aging and/or deterioration of certain objects that are subject to extended periods of exposure.

While such direct exposure to radiation in the infrared and ultraviolet spectral regions can be undesirable, radiation in the visible spectral regions is generally desirable for the purpose of illuminating enclosed areas. Additionally, in order for a transparent panel, such as is used in windows, to serve its generally intended purpose, it must remain transparent at least along predetermined lines of sight such that a person is able, for example, to see through the panel.

In other situations requirements may be such that a window should be constructed to not allow vision along predetermined lines of sight in order to provide privacy for the occupants of a room or enclosure. At the same time the incidence of direct sunlight may be desirable for purposes of allowing sunbathing or for the resulting heating effects.

There are many devices well known in the prior art that serve to control the incidence of direct sunlight into a room or enclosure. Most common are the numerous varieties of shades and blinds that are adapted to be mounted adjacent a window casing. These shades and blinds are, however, often unsightly, cumbersome and inconvenient from the standpoint of maintenance and cleaning.

Also found in the prior art are devices generally comprising panels formed in a fashion somewhat similar to the instant invention wherein a pair of transparent plates having a corrugated surface are fitted together to form a single panel having opaque portions internally extending along one of its primary surface area dimensions. Examples of such prior art devices are presented by U.S. Pat. Nos. 2,976,759 and 3,393,034. These devices are fabricated to have a gap between the respective fitted plates forming the panel and, as a consequence, the optical phenomenon commonly referred to as parallax is normally present. An additional disadvantage is the care and precision that is required in fabricating the corrugated surfaces of such prior art devices for the purpose of avoiding an excessive amount of optical distortion.

Thus, the purpose of the present invention is to provide a directionally transmissive optical panel not having the disadvantageous features of prior art devices.

SUMMARY OF THE INVENTION

Briefly, the present invention is a directionally transmissive panel which may be employed to either prevent the passage of direct electromagnetic radiation in the visible and invisible spectral regions, such as sunlight, while providing lines of sight in selected directions, or allow the passage of rays of sunlight incident from selected directions while obstructing predetermined lines of sight.

More particularly, the present invention comprises a pair of transparent or translucent plates each fashioned to have a flat surface and corrugated surface which includes a series of peaks and valleys formed by a plurality of adjacent flat sections. The corrugations extend along the width or horizontal dimension of the respective plates, alternate ones of the sections having an opaque or a reflective coating which serves to obstruct the direct passage of incident radiation when the corrugated surfaces are maintained in an integral interlocking relationship.

Accordingly, it is an object of the present invention to provide a panel for controllably obstructing the direct transmission of sunlight, when incident on the panel from predetermined directions, while providing an unobstructed line of sight in selected other directions.

Another object of the present invention is to provide a directionally transmissive panel that will allow true undistorted images to be projected therethrough.

A further object of the present invention is to provide an optical panel for controlling the passage of incident radiation in the visible and invisible spectral regions, which panel is free of parallax.

Still another object of the present invention is to provide a directional radiation transmissive panel that is simple to fabricate and easy to maintain.

DESCRIPTION OF THE DRAWINGS

Other objects and many of the attendant advantages of this invention will be more readily appreciated as the same becomes better understood by reference to the following detailed description which is to be considered in connection with the accompanying drawings in which like reference symbols designate like parts throughout the figures thereof and wherein:

FIG. 1 is an isometric diagram illustrating a section of a directional panel for controlling the passage of incident radiation in accordance with the invention;

FIG. 2 is a schematic drawing illustrating an exemplary cross-sectional side view of the invention; and FIGS. 3–6 are schematic drawings illustrating cross-sectional side views of panels respectively having an exemplary variety of corrugated surface configurations adapted for different panel uses in accordance with the invention.

DESCRIPTION OF THE PREFERRED EMBODIMENTS

Referring to FIGS. 1 and 2 of the drawings, a preferred embodiment of the present invention comprises a pair of generally identical plates 10 and 12, as illustrated, the plates 10 and 12 are each adapted to have a flat surface 14 and a corrugated surface 16 formed by a series of adjacent, flat, alternately identical sections 18 and 20 extending parallel to each other for the width or along the horizontal dimension of the plates 10 and 12. The alternately identical sections 18 and 20 are configured to form what may be described as a continuing series of peaks and valleys. One set of the alternately identical sections 18 and 20 is adapted to have an opaque or reflective area comprising a coating 22 extending for the length thereof and covering at least one-half, but preferably more than one-half, the width thereof.

The opaque or reflective coating 22 may comprise any of the conventional materials and may be applied, for example, to the sections 20, by any of the techniques or methods well known in the prior art. In that neither the specific type of coating nor the method of applying the coating 22 to the sections 18 or 20 is intended as a part of the invention, a more detailed description in these regards is not herein provided. Preferably, the opaque or reflective coating 22 is characterized by the capability of obstructing the passage of electromagnetic radiation in the visible and invisible spectral regions ranging from the infrared region to the ultraviolet region.

Each of the plates 10 and 12 may be fabricated of glass or suitable plastic which may be cut, molded or etched to have the desired flat surface 14 and the corrugated surface 16. As earlier indicated, the plate 10 and 12 are generally identical and as such should be formed with the same material, whether it be glass or plastic, such that the plates 10 and 12 have identical optical characteristics. In those cases where the inventive panel is intended to allow vision therethrough, the plates 10 and 12 should be transparent. However, where only the passage of light therethrough is desired, for example, for illumination purposes, then the panels may be fabricated with a translucent material.

A directionally transmissive panel, in accordance with the invention, is fabricated by placing and maintaining the corrugated surfaces 16 in interlocking intimate optical contact. This may be accomplished by either bonding the respective plates 10 and 12 together with any optically free adhesive that is available in the prior art or by fusing the respective plates 10 and 12 together by employing an appropriate amount of heat and pressure.

As illustrated in FIG. 2, the alternately identical sections 18 and 20 may be alternately separated by flat or planar portions 24 and 26 which may facilitate the securing of the corrugated surfaces 16 in intimate interlocking optical contact by avoiding the precision with which sharp peaks generally must be prepared to allow the desired optical contact.

It is to be noted that it is important that the plates 10 and 12 be secured in intimate optical contact such that there not be any parallax or distortion of light images projected through the panel.

As heretofore discussed the opaque or reflective coatings 22, which are effectively embedded in the assembled directionally transmissive panel, serves to partially or completely obstruct the passage of light and heat through the panel when such light and heat, as typically represented by sunlight, is incident on the panel from directions not parallel to the plane of the opaque or reflective strip formed by the layers of opaque or reflective material 22. Similarly, the orientation of the opaque or reflective strip can serve to obstruct the passage of light images through the panel such that only limited lines of sight are available. A more complete understanding of some of the applications for the subject panel may be obtained by reference to FIGS. 3-6 of the drawings.

Referring to FIG. 3, a cross-sectional view of a panel is shown wherein the opaque or reflective sections 30 are substantially horizontal. Assuming that the panel is employed as a windowpane with the plate 10 serving as the external surface and the plate 12 serving as the internal surface, sunlight incident on the panel from the general direction indicated by the arrow 32 will be obstructed and thus not allowed to pass directly through the panel. Of course some light will be reflected by the sections 30 and will thus allow illumination of an enclosed internal area. While direct sunlight is obstructed, it is clear that light images will be able to be projected through the panel in the general direction indicated by the arrow 34 provided that the plates 10 and 12 are transparent.

In contrast, the opposite effect is obtained by having the opaque or reflective sections 30 oriented at a steep angle as illustrated by FIG. 4. Clearly, sunlight projected from the direction indicated by the arrow 36 will be projected through the panel while the lines of sight in the general direction indicated by the arrow 38 are obstructed. This particular steep orientation of the opaque sections 30 allow for the privacy of the occupants of a room while yet permitting sunlight to be projected through the panel into the room when the panel is employed as a windowpane in a low story room.

FIG. 5 illustrates an orientation of the opaque sections 30 intermediate that shown by FIGS. 3 and 4, respectively. This intermediate orientation permits a diminished amount of sunlight to be projected through the panel when incident from the general direction indicated by the arrow 40 and permits a limited view in the general direction indicated by the arrow 42. It is to be understood that the sections 30 may be provided with any desired orientation dependent upon the application of the panel.

While the opaque or reflective sections 30 shown in FIGS. 3–5 are substantially parallel to each other, there may be certain applications for the panel wherein lines of sight in a number of directions, generally indicated by the arrows 44, 46 and 48 illustrated in FIG. 6, is desired. An example of such an application is where the panel is employed as the windshield of an automobile. To accommodate this requirement, the sections 30 may be situated in varying nonparallel orientations such that these different lines of sight are available while direct sunlight is partially obstructed at certain angles of incidence for purposes of reducing the amount of glare and the degree of blinding that may result from the direct incidence of sunlight on the eyes of an operator of a motor vehicle.

While preferred embodiments of the present invention have been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A directionally transmissive optical panel comprising a pair of optically identical plates each having a first surface that is flat and a second surface that is corrugated, said corrugated surfaces being formed by a plurality of adjacently oriented elongate planar sections extending along one dimension of said plates, alternate ones of said planar sections having an opaque area extending for the length of said section wherein said second surfaces of said identical plates are secured in interlocking intimate optical contact.

2. The apparatus defined by claim 1 wherein said planar sections included in said corrugated second surfaces are arranged to form a series of peaks and valleys.

3. The apparatus defined by claim 1 wherein said pair of identical plates are transparent.

4. The apparatus defined by claim 1 wherein said pair of identical plates are translucent.

5. The apparatus defined by claim 1 wherein said second surfaces of said pair of identical plates are secured in interlocking intimate optical contact by the application of heat and pressure to said plates.

6. The apparatus defined by claim 1 wherein said second surfaces of said pair of identical plates are secured in interlocking intimate optical contact by an optically free adhesive.

7. The apparatus defined by claim 1 wherein alternate ones of said planar sections are oriented in a parallel relationship.

8. The apparatus defined by claim 1 wherein the opaque area of each of said alternate planar sections will obstruct the transmission, therethrough, of electromagnetic radiation in the infrared, visible and ultraviolet spectral regions.

9. The apparatus defined by claim 1 wherein said pair of optically identical plates are physically identical.